United States Patent
Otomo et al.

(10) Patent No.: US 10,641,116 B2
(45) Date of Patent: May 5, 2020

(54) VANE AND GAS TURBINE INCLUDING THE SAME

(71) Applicant: Mitsubishi Hitachi Power Systems, Ltd., Kanagawa (JP)

(72) Inventors: Hiroyuki Otomo, Yokohama (JP); Satoshi Hada, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 156 days.

(21) Appl. No.: 15/742,305

(22) PCT Filed: Aug. 1, 2016

(86) PCT No.: PCT/JP2016/072500
§ 371 (c)(1),
(2) Date: Jan. 5, 2018

(87) PCT Pub. No.: WO2017/026314
PCT Pub. Date: Feb. 16, 2017

(65) Prior Publication Data
US 2018/0202301 A1    Jul. 19, 2018

(30) Foreign Application Priority Data

Aug. 11, 2015   (JP) .................................. 2015-158955

(51) Int. Cl.
*F01D 9/04* (2006.01)
*F02C 7/18* (2006.01)
(Continued)

(52) U.S. Cl.
CPC .............. *F01D 9/041* (2013.01); *F01D 9/04* (2013.01); *F01D 11/00* (2013.01); *F01D 11/005* (2013.01);
(Continued)

(58) Field of Classification Search
CPC ........ F01D 11/005; F01D 25/08; F01D 25/12; F01D 25/246; F01D 9/041
See application file for complete search history.

(56) References Cited

U.S. PATENT DOCUMENTS

| | | | |
|---|---|---|---|
| 4,017,213 A | * | 4/1977 | Przirembel ............. F01D 5/187 416/97 A |
| 7,695,247 B1 | * | 4/2010 | Liang ...................... F01D 5/186 416/193 A |

(Continued)

FOREIGN PATENT DOCUMENTS

| | | |
|---|---|---|
| EP | 2562358 | 2/2013 |
| JP | 2001-254605 | 9/2001 |

(Continued)

OTHER PUBLICATIONS

International Search Report dated Sep. 20, 2016 in International (PCT) Application No. PCT/JP2016/072500.

(Continued)

*Primary Examiner* — Dwayne J White
*Assistant Examiner* — Wesley Le Fisher
(74) *Attorney, Agent, or Firm* — Wenderoth, Lind & Ponack, L.L.P.

(57) ABSTRACT

A plurality of circumferential blowout passages that communicate with a cavity into which cooling air flows and that open in a circumferential end surface are formed in a shroud of a vane. Of a central region of the circumferential end surface, an upstream-side region of the circumferential end surface, and a downstream-side region of the circumferential end surface, at least the central region has openings of the plurality of circumferential blowout passages formed therein. A density that is the number of the openings of the circumferential blowout passages per unit length in an axial direction is highest in the central region.

8 Claims, 8 Drawing Sheets

(51) Int. Cl.
　　　*F01D 11/00*　　　(2006.01)
　　　*F01D 25/12*　　　(2006.01)

(52) U.S. Cl.
　　CPC ................ *F01D 25/12* (2013.01); *F02C 7/18* (2013.01); *F05D 2220/32* (2013.01); *F05D 2240/81* (2013.01); *F05D 2260/201* (2013.01); *F05D 2260/202* (2013.01)

(56) References Cited

U.S. PATENT DOCUMENTS

| | | | |
|---|---|---|---|
| 8,206,114 B2 * | 6/2012 | Spangler | F01D 5/187 416/193 A |
| 9,416,666 B2 * | 8/2016 | Boyer | F01D 5/187 |
| 9,988,916 B2 * | 6/2018 | Winn | F01D 25/12 |
| 2001/0021343 A1 | 9/2001 | Kuwabara et al. | |
| 2002/0090296 A1 | 7/2002 | Kuwabara et al. | |
| 2005/0123388 A1 * | 6/2005 | Brian Chan | F01D 9/041 415/1 |
| 2006/0133922 A1 * | 6/2006 | Heyward | F01D 9/042 415/115 |
| 2007/0253816 A1 | 11/2007 | Walz et al. | |
| 2012/0177479 A1 * | 7/2012 | Azad | F01D 5/187 415/115 |
| 2013/0115102 A1 | 5/2013 | Walunj et al. | |
| 2013/0171003 A1 | 7/2013 | Ellis et al. | |
| 2015/0118033 A1 * | 4/2015 | Smith | F01D 25/12 415/175 |
| 2016/0177751 A1 * | 6/2016 | Otomo | F01D 5/02 60/805 |

FOREIGN PATENT DOCUMENTS

| | | |
|---|---|---|
| JP | 2002-201913 | 7/2002 |
| JP | 2005-163791 | 6/2005 |
| JP | 2007-292052 | 11/2007 |
| JP | 2010-001764 | 1/2010 |
| WO | 2014159212 | 10/2014 |
| WO | 2015/053846 | 4/2015 |

OTHER PUBLICATIONS

Written Opinion of the International Searching Authority dated Sep. 20, 2016 in International (PCT) Application No. PCT/JP2016/072500, with English translation.

* cited by examiner

VANE AND GAS TURBINE INCLUDING THE SAME

TECHNICAL FIELD

The present invention relates to a vane and a gas turbine including the same.

The present application claims priority based on Japanese Patent Application No. 2015-158955 filed on Aug. 11, 2015, the contents of which are incorporated herein by reference.

BACKGROUND ART

A gas turbine includes a rotor that rotates around an axis and a casing that covers this rotor. The rotor has a rotor shaft and a plurality of blades mounted on this rotor shaft. A plurality of vanes are provided on the inner side of the casing.

The vane has a vane body extending in a radial direction of the axis, an inner shroud provided on the radially inner side of the vane body, and an outer shroud provided on the radially outer side of the vane body. The vane body of the vane is disposed inside a combustion gas flow passage through which combustion gas passes. The inner shroud defines the position of the combustion gas flow passage on the radially inner side. The outer shroud defines the position of the combustion gas flow passage on the radially outer side.

This vane is exposed to the high-temperature combustion gas. Therefore, the vane is commonly cooled with air etc.

For example, the vane described in Patent Literature 1 below has various cooling passages through which cooling air passes. Specifically, the vane body of this vane has air passages which extend in the radial direction and into which cooling air flows. Openings of the plurality of air passages are formed in a pair of circumferential end surfaces of the inner shroud that face opposite sides in a circumferential direction. These openings of the plurality of air passages are arrayed in an axial direction in which the axis extends.

CITATION LIST

Patent Literature

Patent Literature 1: Japanese Patent Laid-Open No. 2007-292052

SUMMARY OF INVENTION

Technical Problem

For the vane of a gas turbine, it is desirable to effectively cool the vane so as to improve the durability of the vane and at the same time reduce as much as possible the amount of air used to cool the vane.

An object of the present invention is therefore to provide a vane that makes it possible to improve the durability and at the same time reduce the amount of cooling air used, and a gas turbine including this vane.

Solution to Problem

A vane as a first aspect according to the present invention to achieve the above object is a vane of a gas turbine in which a plurality of vanes are disposed in an array in a circumferential direction around a rotor shaft, the vane including:

a vane body that is disposed inside a combustion gas flow passage through which combustion gas flows, and that extends in a radial direction of the rotor shaft; and a shroud that is formed at an end of the vane body in the radial direction and defines a part of the combustion gas flow passage, wherein the shroud has a gas path surface that faces the radial direction and comes in contact with the combustion gas, a pair of circumferential end surfaces that face opposite sides in the circumferential direction, a cavity into which cooling air flows, and a plurality of circumferential blowout passages that communicate with the cavity and open in the circumferential end surface, the circumferential end surface has a central region that is a region located inside a throat circle being a circle with a minimum radius of circles in contact with both the vane body of the vane and a vane body of another vane adjacent to the vane in the circumferential direction, an upstream-side region that is located further on an upstream side of the combustion gas flow passage than the central region, and a downstream-side region that is located on the opposite side of the central region from the upstream side, and openings of the plurality of circumferential blowout passages are formed at least in the central region, and a density that is the number of the openings of the circumferential blowout passages per unit length in an axial direction in which the rotor shaft extends is higher in the central region than in the upstream-side region and the downstream-side region.

Tests etc. have confirmed that the central region of the circumferential end surface of the shroud reaches a higher temperature than the upstream-side region and the downstream-side region of the circumferential end surface. In this vane, therefore, cooling air is blown out at least from the central region of the circumferential end surface of the shroud to intensively cool this central region. Thus, thermal damage to the central region can be reduced in this vane. On the other hand, the temperatures of the upstream-side region and the downstream-side region of the circumferential end surface are lower than the temperature of the central region. In this vane, therefore, the density of the openings of the circumferential blowout passages is set to be lower in the upstream-side region and the downstream-side region than in the central region.

Thus, according to this vane, it is possible to efficiently use cooling air so as to improve the durability of the vane and at the same time reduce the amount of cooling air used.

A vane as a second aspect according to the present invention to achieve the above object is the vane of the first aspect, wherein the density of the openings of the circumferential blowout passages in the upstream-side region and the downstream-side region is zero.

According to this vane, cooling air can be used more efficiently.

A vane as a third aspect according to the present invention to achieve the above object is the vane of the first or second aspect, wherein: of the pair of circumferential end surfaces, one circumferential end surface forms a pressure-side end surface that is on a pressure side of the vane body in the circumferential direction, and the other circumferential end surface forms a suction-side end surface that is on a suction side of the vane body in the circumferential direction; and the density of the openings of the plurality of circumferential blowout passages is higher in the pressure-side end surface than in the suction-side end surface.

A vane as a fourth aspect according to the present invention to achieve the above object is the vane of the third aspect, wherein the density of the openings of the circumferential blowout passages in the suction-side end surface is zero.

Tests etc. have confirmed that a vane can be cooled most efficiently when the openings of the plurality of circumferential blowout passages are formed only in the pressure-side end surface. Thus, according to the above vane, the vane can be efficiently cooled.

A vane as a fifth aspect according to the present invention to achieve the above object is the vane of any one of the first to fourth aspects, wherein: each of the pair of circumferential end surfaces has a seal groove formed therein in which a seal plate that seals a gap between the shroud of the vane and the shroud of another vane adjacent to the vane in the circumferential direction is mounted; and the openings of the plurality of circumferential blowout passages are formed on a side closer to the seal groove than to the gas path surface in the radial direction.

Cooling air having flowed out of the circumferential blowout passages diffuses gradually as it approaches the gas path surface. In this vane, the openings of the circumferential blowout passages are formed in the circumferential end surface of the shroud, on the side closer to the seal groove than to the gas path surface in the radial direction. Accordingly, in this vane, cooling air has diffused more widely at the point when the cooling air reaches the gas path surface than if the openings of the circumferential blowout passages are formed in the circumferential end surface of the shroud, on the side closer to the gas path surface than to the seal groove in the radial direction. Thus, according to this vane, a large area of the circumferential end surface of each shroud can be cooled with currents of the cooling air flowing out of the plurality of circumferential blowout passages. Moreover, in this vane, regions of diffusion of the currents of the cooling air flowing out of the plurality of circumferential blowout passages overlap one another at the point when the cooling air reaches the gas path surface. Thus, according to this vane, combustion gas from the combustion gas flow passage can be kept from flowing into a gap between the circumferential end surface of the shroud of one vane and the circumferential end surface of the shroud of another vane adjacent to this one vane.

A vane as a sixth aspect according to the present invention to achieve the above object is the vane of any one of the first to fifth aspects, wherein: a circumferential end passage that communicates with the cavity and extends along the circumferential end surface in a direction having a component of the axial direction is formed inside the shroud; and, relative to the circumferential end passage, the openings of the plurality of circumferential blowout passages are formed on the opposite side from the gas path surface in the radial direction.

According to this vane, too, a wide area of the circumferential end surface of each shroud can be cooled with the currents of the cooling air flowing out of the plurality of circumferential blowout passages. Moreover, according to this vane, a region of the circumferential end surface of each shroud that is cooled with the currents of the cooling air flowing out of the plurality of circumferential blowout passages can also be cooled with cooling air flowing through the circumferential end passage.

A vane as a seventh aspect according to the present invention to achieve the above object is the vane of the sixth aspect, wherein the plurality of circumferential blowout passages communicate with the circumferential end passage.

A vane as another aspect according to the present invention to achieve the above object is a vane of a gas turbine in which a plurality of vanes are disposed in an array in a circumferential direction around a rotor shaft, the vane including:

a vane body that is disposed inside a combustion gas flow passage through which combustion gas flows, and that extends in a radial direction of the rotor shaft; and a shroud that is formed at an end of the vane body in the radial direction and defines a part of the combustion gas flow passage, wherein the shroud has a gas path surface that faces the radial direction and comes in contact with the combustion gas, a pair of circumferential end surfaces that face opposite sides in the circumferential direction, a seal groove which is recessed from one circumferential end surface of the pair of circumferential end surfaces toward the other circumferential end surface and in which a plurality of seal plates are fitted, a cavity into which cooling air flows, and a plurality of circumferential blowout passages that communicate with the cavity and open in the circumferential end surface, the one circumferential end surface has a central region that is a region including a joint of the plurality of seal plates and located inside a circle having the same radius as a throat circle being a circle with a minimum radius of circles in contact with both the vane body of the vane and a vane body of another vane adjacent to the vane in the circumferential direction, an upstream-side region that is located further on an upstream side of the combustion gas flow passage than the central region, and a downstream-side region that is located on the opposite side of the central region from the upstream side, and openings of the plurality of circumferential blowout passages are formed at least in the central region, and a density that is the number of the openings of the circumferential blowout passages per unit length in an axial direction in which the rotor shaft extends is higher in the central region than in the upstream-side region and the downstream-side region.

A vane as yet another aspect according to the present invention to achieve the above object is a vane of a gas turbine in which a plurality of vanes are disposed in an array in a circumferential direction around a rotor shaft, the vane including:

a vane body that is disposed inside a combustion gas flow passage through which combustion gas flows, and that extends in a radial direction of the rotor shaft;

a shroud that is formed at an end of the vane body in the radial direction and defines a part of the combustion gas flow passage; and a retainer that extends toward a radially inner side from a part of the shroud in an axial direction in which the rotor shaft extends, wherein the shroud has a gas path surface that faces the radial direction and comes in contact with the combustion gas, a pair of circumferential end surfaces that face opposite sides in the circumferential direction, a cavity into which cooling air flows, and a plurality of circumferential blowout passages that communicate with the cavity and open in the circumferential end surface, the circumferential end surface has a central region that is a region including a region in which the retainer is provided in the axial direction, and located inside a circle having the same radius as a throat circle being a circle with a minimum radius of circles in contact with both the vane body of the vane and a vane body of another vane adjacent to the vane in the circumferential direction, an upstream-side region that is located further on an upstream side of the combustion gas flow passage than the central region, and a downstream-side region that is located on the opposite side of the central region from the upstream side, and openings of the plurality of circumferential blowout passages are formed at least in the central region, and a density that is the number of the openings of the circumferential blowout passages per unit length in the axial direction is higher in the central region than in the upstream-side region and the downstream-side region.

A gas turbine as an eighth aspect according to the present invention to achieve the above object includes: the plurality of vanes; the rotor shaft; a plurality of blades mounted on the rotor shaft; and a casing on an inner circumferential side of which the plurality of vanes are mounted and which covers the rotor shaft and the plurality of blades.

Advantageous Effects of Invention

According to one aspect of the present invention, it is possible to effectively cool the vane so as to improve the durability thereof and at the same time reduce the amount of cooling air used.

DESCRIPTION OF EMBODIMENTS

An embodiment of the present invention and modified examples thereof will be described below in detail with reference to the drawings.

Embodiment

Figure 1:
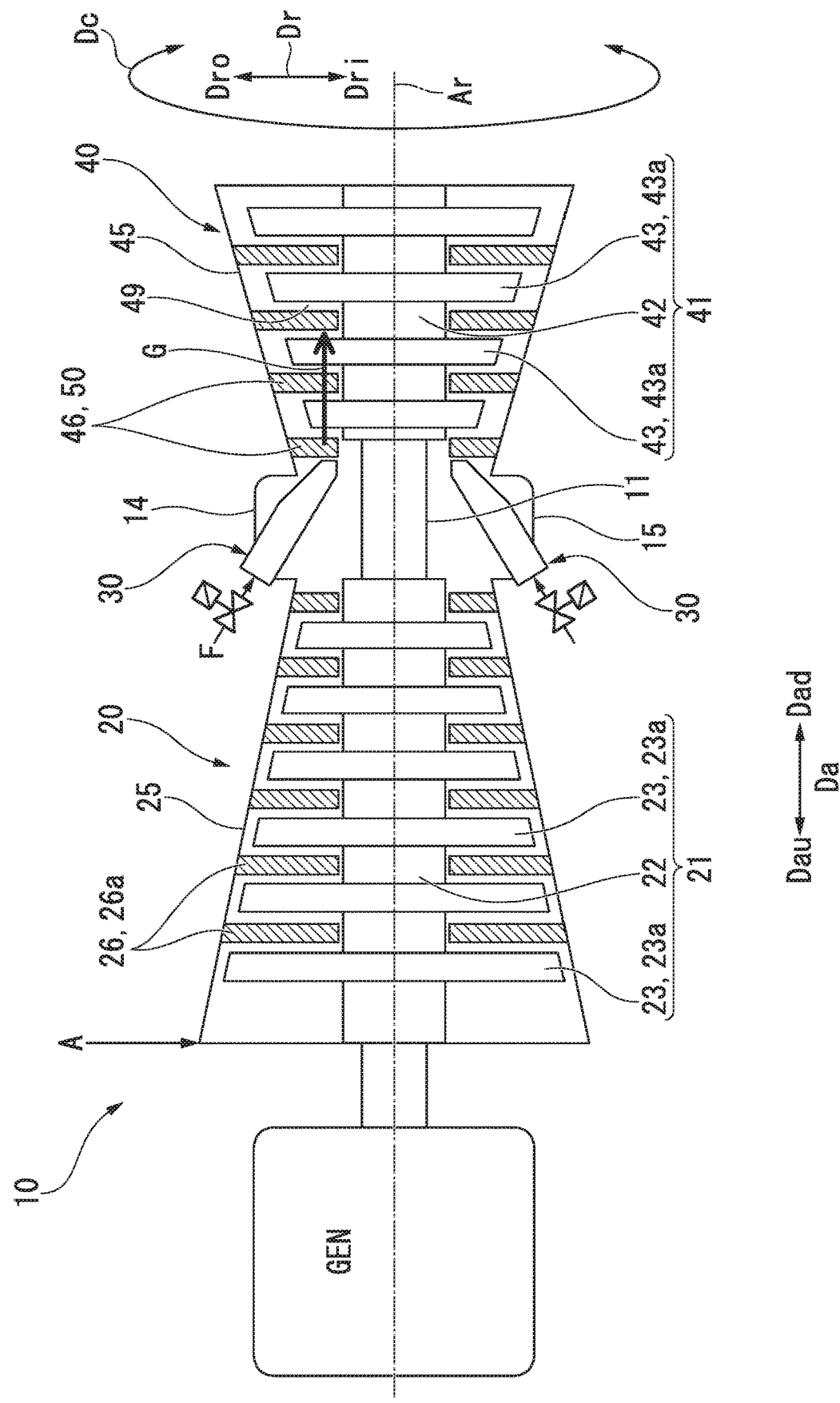
FIG. 1 is a schematic sectional view of a gas turbine in an embodiment according to the present invention.

As shown in FIG. 1, a gas turbine 10 as an embodiment according to the present invention includes a compressor 20 that compresses air, combustors 30 that generate combustion gas by combusting fuel in air A compressed by the compressor 20, and a turbine 40 that is driven by the combustion gas.

The compressor 20 has a compressor rotor 21 that rotates around an axis Ar, a compressor casing 25 that covers the compressor rotor 21, and a plurality of vane rows 26. The turbine 40 has a turbine rotor 41 that rotates around the axis Ar, a turbine casing 45 that covers the turbine rotor 41, and a plurality of vane rows 46.

The compressor rotor 21 and the turbine rotor 41 are located on the same axis Ar and connected to each other to form a gas turbine rotor 11. For example, a rotor of a generator GEN is connected to the gas turbine rotor 11. The gas turbine 10 further includes an intermediate casing 14 that is disposed between the compressor casing 25 and the turbine casing 45. The combustors 30 are mounted on the intermediate casing 14. The compressor casing 25, the intermediate casing 14, and the turbine casing 45 are connected to one another to form a gas turbine casing 15. Hereinafter, a direction in which the axis Ar extends will be referred to as an axial direction Da. A circumferential direction around the axis Ar will be referred to simply as a circumferential direction Dc, and a direction perpendicular to the axis Ar will be referred to as a radial direction Dr. In the axial direction Da, the side of the compressor 20 relative to the turbine 40 and the opposite side will be respectively referred to as an upstream side Dau and a downstream side Dad. In the radial direction Dr, the side closer to the axis Ar and the opposite side will be respectively referred to as a radially inner side Dri and a radially outer side Dro.

The turbine rotor 41 has a rotor shaft 42 that extends in the axial direction Da around the axis Ar, and a plurality of blade rows 43 that are mounted on the rotor shaft 42. The plurality of blade rows 43 are arrayed in the axial direction Da. Each blade row 43 is composed of a plurality of blades 43a that are arrayed in the circumferential direction Dc. One vane row 46 is disposed on the upstream side Dau of each of the plurality of blade rows 43. The vane rows 46 are provided on an inner side of the turbine casing 45. Each vane row 46 is composed of a plurality of vanes 50 that are arrayed in the circumferential direction Dc.

An annular space which is defined between an outer circumferential side of the rotor shaft 42 and an inner circumferential side of the turbine casing 45 and in which the vanes 50 and the blades 43a are disposed in the axial direction Da forms a combustion gas flow passage 49 through which combustion gas G from the combustors 30 flows. The combustion gas flow passage 49 forms an annular shape around the axis Ar and is long in the axial direction Da.

Figure 2:
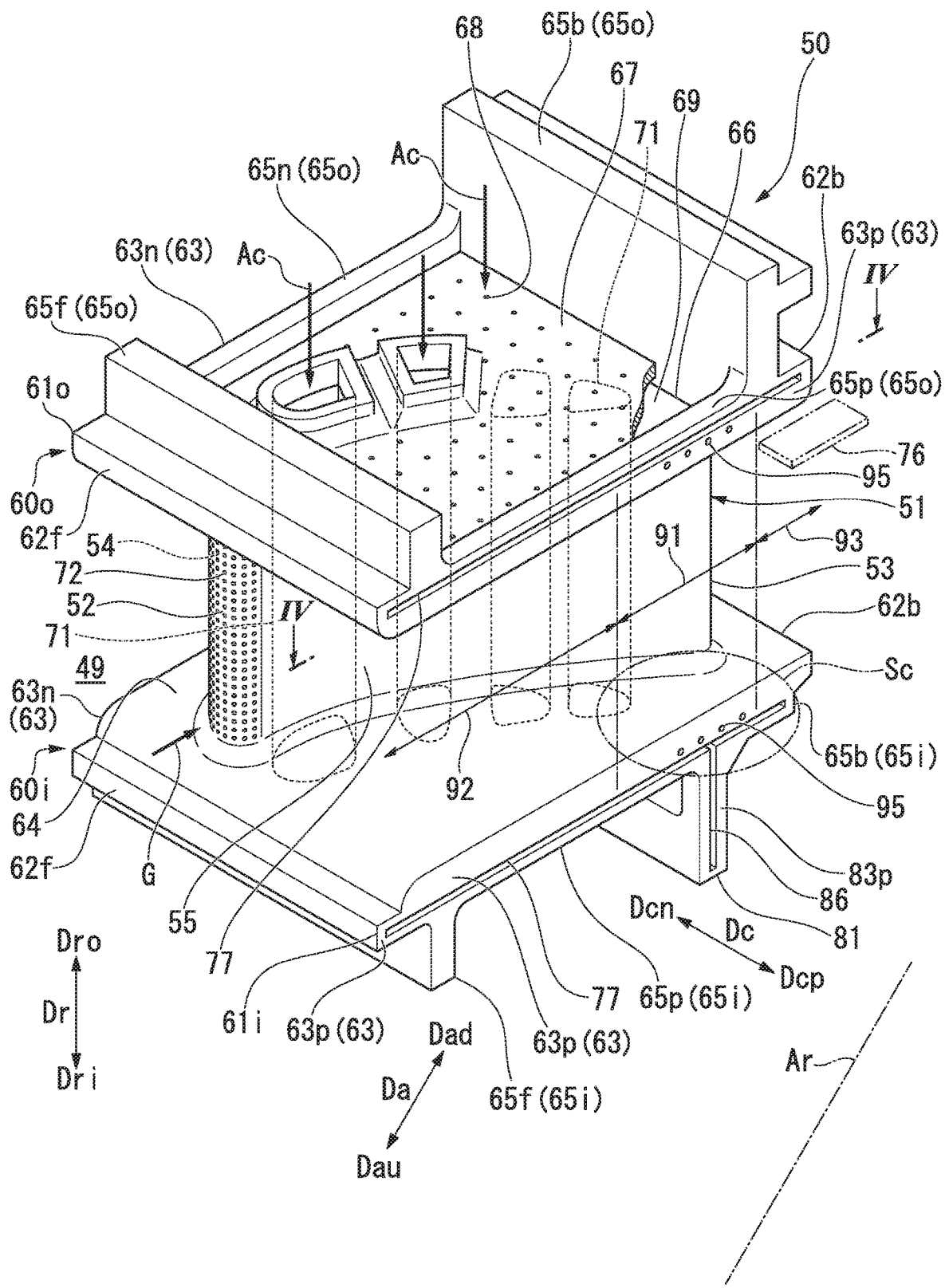
FIG. 2 is a perspective view of a vane in the embodiment according to the present invention.
Figure 3:
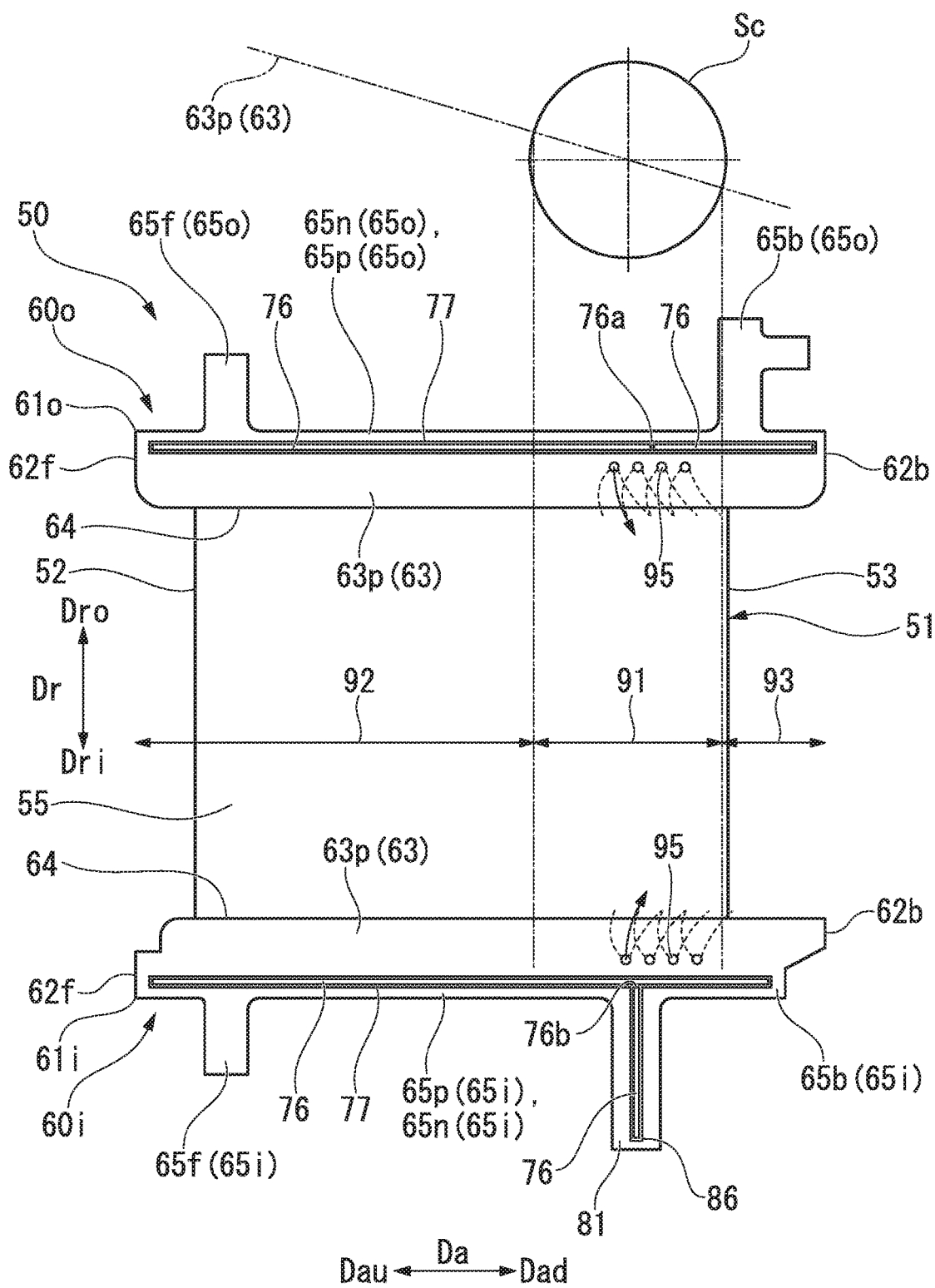
FIG. 3 is a side view of the vane in the embodiment according to the present invention.

As shown in FIG. 2 and FIG. 3, the vane 50 of the turbine 40 has a vane body 51 extending in the radial direction Dr, an inner shroud 60i formed on the radially inner side Dri of the vane body 51, and an outer shroud 60o formed on the radially outer side Dro of the vane body 51. The vane body 51 is disposed inside the combustion gas flow passage 49 through which the combustion gas G passes. The inner shroud 60i defines the position of the annular combustion gas flow passage 49 on the radially inner side Dri. The outer shroud 60o defines the position of the annular combustion gas flow passage 49 on the radially outer side Dro.

Figure 4:
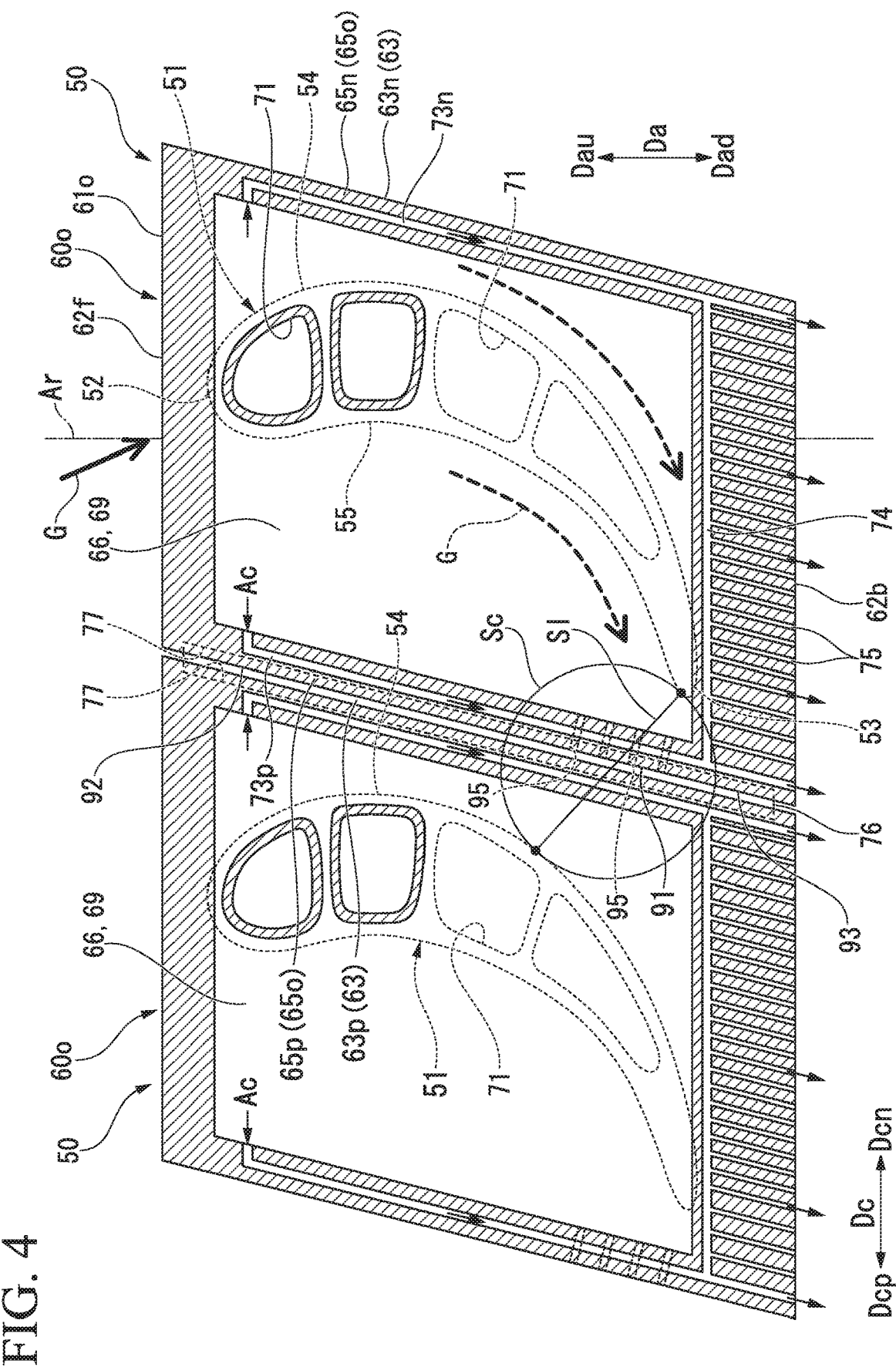
FIG. 4 is a sectional view taken along the line IV-IV of FIG. 2.

As shown in FIG. 2 to FIG. 4, an end of the vane body 51 on the upstream side Dau forms a leading edge 52, and an end thereof on the downstream side Dad forms a trailing edge 53. Of surfaces of the vane body 51 facing the circumferential direction Dc, a convex surface forms a suction-side surface 54 (=negative pressure surface), and a concave surface forms a pressure-side surface 55 (=positive pressure surface). For the convenience of the following description, a pressure side (=positive pressure surface side) of the vane body 51 and a suction side (=negative pressure surface side) of the vane body 51 in the circumferential direction Dc will be respectively referred to as a circumferential pressure side Dcp and a circumferential suction side Dcn. The upstream side Dau in the axial direction Da and the downstream side Dad in the axial direction Da may be respectively referred to as a front side and a back side.

The outer shroud 60o has an outer shroud main body 610 that has a shape of a plate spreading in the axial direction Da and the circumferential direction Dc, and a peripheral wall 65o that extends along an outer peripheral edge of the outer shroud main body 61o and protrudes from the outer shroud main body 61o toward the radially outer side Dro.

The outer shroud main body 61o has a front end surface 62f that is an end surface on the upstream side Dau, a back end surface 62b that is an end surface on the downstream side Dad, a pair of circumferential end surfaces 63 that face opposite sides in the circumferential direction Dc, and a gas path surface 64 that faces the radially inner side Dri. Of the pair of circumferential end surfaces 63, the end surface on the circumferential pressure side Dcp forms a pressure-side end surface 63p, and the end surface on the circumferential suction side Dcn forms a suction-side end surface 63n. The front end surface 62f and the back end surface 62b are roughly parallel to each other. The pressure-side end surface 63p and the suction-side end surface 63n are roughly parallel to each other. Thus, when seen from the radial direction Dr, the outer shroud main body 61o has a parallelogram shape as shown in FIG. 4. A seal groove 77 that is recessed toward the circumferential suction side Dcn and extends along the pressure-side end surface 63p of the outer shroud 60o in a direction having a component of the axial direction Da is formed in the pressure-side end surface 63p. Another seal groove 77 that is recessed toward the circumferential pressure side Dcp and extends along the suction-side end surface 63n of the outer shroud 60o in a direction having a component of the axial direction Da is formed in the suction-side end surface 63n. Of the outer shrouds 60o of two vanes 50 adjacent to each other in the circumferential direction Dc, the pressure-side end surface 63p of the outer shroud 60o of one vane 50 and the suction-side end surface 63n of the outer shroud 60o of the other vane 50 face each other across a clearance in the circumferential direction Dc. A seal plate 76 is disposed between the pressure-side end surface 63p of the outer shroud 60o of the one vane 50 and the suction-side end surface 63n of the outer shroud 60o of the other vane 50. Both ends of the seal plate 76 in the circumferential direction Dc are respectively fitted into the seal groove 77 formed in the pressure-side end surface 63p and the seal groove 77 formed in the suction-side end surface 63n. The seal plate 76 serves to prevent cooling air Ac inside the turbine casing 45 from leaking into the combustion gas flow passage 49 through the clearance between the outer shrouds 60o of two vanes 50 adjacent to each other in the circumferential direction Dc.

The peripheral wall 65o has a front peripheral wall 65f and a back peripheral wall 65b facing each other in the axial direction Da, and a pair of side peripheral walls 65p, 65n facing each other in the circumferential direction Dc. Of the pair of side peripheral walls 65p, 65n, the side peripheral wall on the circumferential pressure side Dcp forms a pressure-side peripheral wall 65p, and the side peripheral wall on the circumferential suction side Dcn forms a suction-side peripheral wall 65n. Each of the front peripheral wall 65f and the back peripheral wall 65b forms a hook by protruding further toward the radially outer side Dro than the pair of side peripheral walls 65p, 65n relative to the outer shroud main body 61o. The front peripheral wall 65f and the back peripheral wall 65b forming the hooks allow the vane 50 to be mounted to the inner circumferential side of the turbine casing 45. In the outer shroud 60o, a recess 66 (see FIG. 2 and FIG. 5) that is recessed toward the radially inner side Dri is formed by the outer shroud main body 61o and the peripheral wall 65o. The surface of the pressure-side peripheral wall 65p on the circumferential pressure side Dcp and the surface of the outer shroud main body 61o on the circumferential pressure side Dcp are flush with each other, and these surfaces form the pressure-side end surface 63p of the outer shroud 60o. The surface of the suction-side peripheral wall 65n on the circumferential suction side Dcn and the surface of the outer shroud main body 61o on the circumferential suction side Dcn are flush with each other, and these surfaces form the suction-side end surface 63n of the outer shroud 60o.

Figure 5:
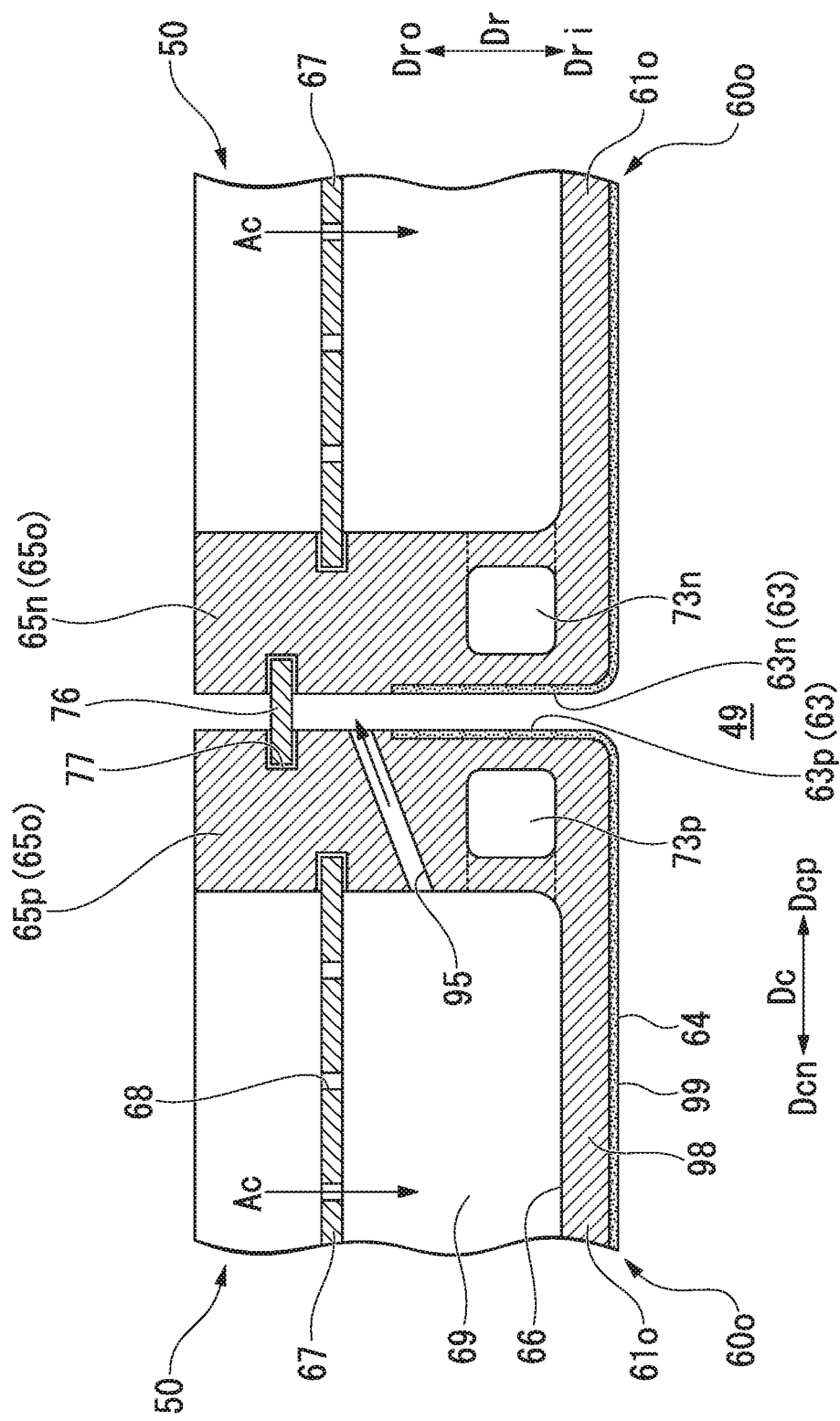
FIG. 5 is a sectional view of main parts of an outer shroud in the embodiment according to the present invention.

As shown in FIG. 5, the vane 50 further includes an impingement plate 67 that partitions a space inside the recess 66 of the outer shroud 60o into a region on the radially outer side Dro and an inner cavity (cavity) 69 that is a region on the radially inner side Dri. A plurality of air holes 68 are formed in the impingement plate 67 so as to extend through the impingement plate 67 in the radial direction Dr. Part of the cooling air Ac present on the radially outer side Dro of the vane 50 flows into the inner cavity 69 through the air holes 68 of the impingement plate 67.

Like the outer shroud 60o, the inner shroud 60i has an inner shroud main body 61i and a peripheral wall 65i as shown in FIG. 2 and FIG. 3. Like the outer shroud main body 61o, the inner shroud main body 61i has a front end surface 62f, a back end surface 62b that is an end surface on the downstream side Dad, a pair of circumferential end surfaces 63, and a gas path surface 64. Of the pair of circumferential end surfaces 63, the end surface on the circumferential pressure side Dcp forms a pressure-side end surface 63p, and the end surface on the circumferential suction side Dcn forms a suction-side end surface 63n. Like the outer shroud main body 61o, the inner shroud main body 61i has a parallelogram shape when seen from the radial direction Dr. A seal groove 77 is also formed in each of the pressure-side end surface 63p and the suction-side end surface 63n of the inner shroud 60i.

The peripheral wall 65i has a front peripheral wall 65f and a back peripheral wall 65b facing each other in the axial direction Da, and a pair of side peripheral walls 65p, 65n facing each other in the circumferential direction Dc. Of the pair of side peripheral walls 65p, 65n, the side peripheral wall on the circumferential pressure side Dcp forms a pressure-side peripheral wall 65p (see FIG. 6), and the side peripheral wall on the circumferential suction side Dcn forms a suction-side peripheral wall 65n. The front peripheral wall 65f protrudes further toward the radially inner side Dri than the pair of side peripheral walls 65p, 65n relative to the outer shroud main body 61o. In the inner shroud 60i, a recess 66 (see FIG. 6) that is recessed toward the radially outer side Dro is formed by the inner shroud main body 61i and the peripheral wall 65i. The surface of the pressure-side peripheral wall 65p on the circumferential pressure side Dcp and the surface of the inner shroud main body 61i on the circumferential pressure side Dcp are flush with each other, and these surfaces form the pressure-side end surface 63p of the inner shroud 60i. The surface of the suction-side peripheral wall 65n on the circumferential suction side Dcn and the surface of the inner shroud main body 61i on the circumferential suction side Dcn are flush with each other, and these surfaces form a suction-side end surface 63n of the inner shroud 60i.

The vanes 50 composing one of the plurality of vane rows are each provided with a retainer 81 that protrudes from the inner shroud 60i toward the radially inner side Dri. The retainer 81 is located between the front peripheral wall 65f and the back peripheral wall 65b in the axial direction Da, and is formed so as to extend from the pressure-side end surface 63p to the suction-side end surface 63n. A pressure-side end surface 83p of the retainer 81 is flush with the pressure-side end surface 63p of the inner shroud main body 61i. Although this is not shown, a suction-side end surface 63n of the retainer 81 is flush with the suction-side end surface 63n of the inner shroud main body 61i. A vertical seal groove 86 that is recessed in the circumferential direction Dc and extends in the radial direction Dr is formed in each of the pressure-side end surface 83p and the suction-side end surface 63n of the retainer 81. A seal plate 76 is fitted in each vertical seal groove 86 as in the seal groove 77 described above.

Figure 6:
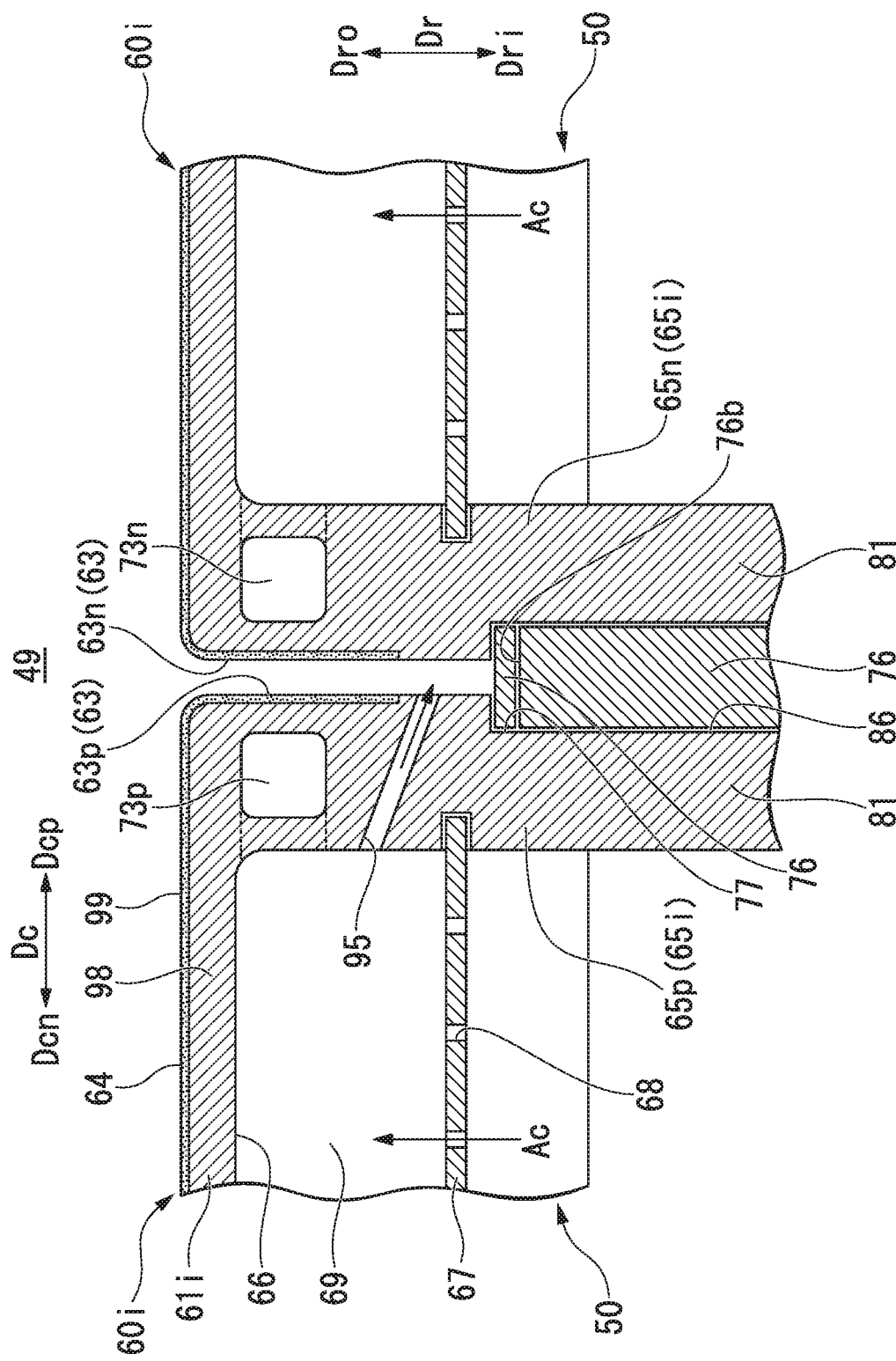
FIG. 6 is a sectional view of main parts of an inner shroud in the embodiment according to the present invention.

As shown in FIG. 6, the vane 50 farther includes an impingement plate 67 that partitions a space inside the recess 66 of the inner shroud 60i into a region on the radially inner side Dri and an inner cavity (cavity) 69 that is a region on the radially outer side Dro. A plurality of air holes 68 are formed in the impingement plate 67 so as to extend through the impingement plate 67 in the radial direction Dr. Part of the cooling air Ac present on the radially inner side Dri of the vane 50 flows into the inner cavity 69 through the air holes 68 of the impingement plate 67.

As shown in FIG. 2, a plurality of vane air passages 71 extending in the radial direction Dr Dc are formed inside the vane body 51, the outer shroud 60o, and the inner shroud 60i. Each vane air passage 71 is formed continuously from the outer shroud 60o through the vane body 51 to the inner shroud 60i. The plurality of vane air passages 71 are arrayed along the chord of the vane body 51. Some of the adjacent vane air passages 71 communicate with each other at a part on the radially outer side Dro or a part on the radially inner side Dri. Some of the plurality of vane air passages 71 open at a bottom of the recess 66 of the outer shroud 60o. Moreover, some of the plurality of vane air passages 71 open at a bottom of the recess 66 of the inner shroud 60i. Part of the cooling air Ac present on the radially outer side Dro or the radially inner side Dri of the vane 50 flows into the vane air passages 71 through openings of these vane air passages 71.

At each of the leading edge 52 and the trailing edge 53 of the vane body 51, a plurality of vane surface blowout passages 72 are formed so as to extend through the edge from the vane air passage 71 to the combustion gas flow passage 49. The vane body 51 is cooled in the process of the cooling air Ac flowing through the vane air passages 71. The cooling air Ac having flowed into the vane air passages 71 flows out of the vane surface blowout passages 72 into the combustion gas flow passage 49. Thus, the leading edge 52 and the trailing edge 53 of the vane body 51 are cooled in the process of the cooling air Ac flowing out of the vane surface blowout passages 72. Moreover, part of the cooling air Ac having flowed out of the vane surface blowout passages 72 into the combustion gas flow passage 49 serves also as film air by partially covering the surface of the vane body 51.

As shown in FIG. 4, a pressure-side passage (circumferential end passage) 73p extending along the pressure-side end surface 63p in a direction having a component of the axial direction Da is formed inside the pressure-side peripheral wall 65p of the pair of side peripheral walls 65p, 65n of the outer shroud 60o. A suction-side passage (circumferential end passage) 73n extending along the suction-side end surface 63n in a direction having a component of the axial direction Da is formed inside the suction-side peripheral wall 65n. Both the pressure-side passage 73p and the suction-side passage 73n communicate at upstream ends thereof with the inner cavity 69. Both the pressure-side passage 73p and the suction-side passage 73n open at downstream ends thereof in the back end surface 62b of the outer shroud main body 61o. A back header passage 74 extending along the back end surface 62b in the circumferential direction Dc is formed inside the outer shroud main body 61o. An end of the back header passage 74 on the circumferential pressure side Dcp is connected to the pressure-side passage 73p. An end of the back header passage 74 on the circumferential suction side Dcn is connected to the suction-side passage 73n. Thus, the back header passage 74 communicates with the pressure-side passage 73p and the suction-side passage 73n. Moreover, a plurality of back passages 75 extending from the back header passage 74 toward the downstream side Dad and opening in the back end surface 62b are formed inside the outer shroud main body 61o. The plurality of back passages 75 are arrayed in the circumferential direction Dc. A portion of each of the pressure-side passage 73p and the suction-side passage 73n on the downstream side Dad from a position at which that passage communicates with the back header passage 74 forms the back passage 75 opening in the back end surface 62b Furthermore, a plurality of circumferential blowout passages 95 are formed inside the pressure-side peripheral wall 65p so as to extend through the pressure-side peripheral wall 65p from the inner cavity 69 to the pressure-side end surface 63p. The plurality of circumferential blowout passages 95 open in the pressure-side end surface 63p.

Here, a circle with a minimum radius of circles that are in contact with both the vane body 51 of the vane 50 and the vane body 51 of another vane 50 adjacent to the vane 50 in the circumferential direction Dc will be referred to as a throat circle Sc. A line connecting a contact point between the throat circle Sc and the vane body 51 of the vane 50 and a contact point between the throat circle Sc and the vane body 51 of the other vane 50 to each other will be referred to as a throat line S1. Moreover, the position of the throat line S1 will be referred to as a throat position. In this embodiment, a region of the pressure-side end surface 63p of the outer shroud 60o that is located inside the throat circle Sc will be referred to as a central region 91. A region of the pressure-side end surface 63p that is located further on the upstream side Dau than the central region 91 will be referred to as an upstream-side region 92, and a region thereof that is located further on the downstream side Dad than the central region 91 will be referred to as a downstream-side region 93. Openings of the plurality of circumferential blowout passages 95 are formed only in the central region 91. Accordingly, in this embodiment, a density that is the number of the openings of the circumferential blowout passages 95 per unit length in the axial direction Da is higher in the central region 91 than in the upstream-side region 92 and the downstream-side region 93.

As shown in FIG. 5, for example, the outer shroud 60o is composed of an alloy 98 having high heat resistance, such as a Ni-base alloy, and a thermal barrier coating (TBC) layer 99 that covers part of the surface of the alloy 98. The surface of the TBC layer 99 forms the gas path surface 64 and the end surfaces of the outer shroud 60o. The openings of the circumferential blowout passages 95 formed inside the pressure-side peripheral wall 65p are formed in the pressure-side end surface 63p of the outer shroud 60o, on the side closer to the seal groove 77 than to the gas path surface 64 in the radial direction Dr. Moreover, relative to the pressure-side passage (circumferential end passage) 73p, the openings of the plurality of circumferential blowout passages 95 are formed on the opposite side from the gas path surface 64 in the radial direction Dr. The alloy 98 is exposed in a region of the pressure-side end surface 63p in which the openings of the circumferential blowout passages 95 are formed, and the TBC layer 99 is not formed in this region.

As with the outer shroud 60o, a pressure-side passage, a suction-side passage, a back header passage, and a plurality of back passages are also formed inside the inner shroud 60i. As shown in FIG. 3 and FIG. 6, a plurality of circumferential blowout passages 95 are also formed inside the pressure-side peripheral wall 65p of the inner shroud 60i so as to extend through the pressure-side peripheral wall 65p from the inner cavity 69 to the pressure-side end surface 63p. The plurality of circumferential blowout passages 95 open in the pressure-side end surface 63p. Openings of these plurality of circumferential blowout passages 95 are also formed only in the central region 91 of the pressure-side end surface 63p of the inner shroud 60i. Accordingly, in this embodiment, the density of the openings of the circumferential blowout passages 95 is higher in the central region 91 than in the upstream-side region 92 and the downstream-side region 93 also in the inner shroud 60i.

As shown in FIG. 6, for example, the inner shroud 60i is also composed of an alloy 98 having high heat resistance, such as a Ni-base alloy, and a TBC layer 99 that covers part of the surface of the alloy 98. The surface of the TBC layer 99 forms the gas paths surface 64 and the end surfaces of the inner shroud 60i. The openings of the circumferential blowout passages 95 formed inside the pressure-side peripheral wall 65p are formed in the pressure-side end surface 63p of the inner shroud 60i, on the side closer to the seal groove 77 than to the gas path surface 64 in the radial direction Dr. Moreover, relative to the pressure-side passage (circumferential end passage) 73p, the openings of the plurality of circumferential blowout passages 95 are formed on the opposite side from the gas path surface 64 in the radial direction Dr. The alloy 98 is exposed in a region of the pressure-side end surface 63p in which the openings of the circumferential blowout passages 95 are formed, and the TBC layer 99 is not formed in this region. The vane body 51 is also composed of an alloy 98 having high heat resistance, such as a Ni alloy, and a TBC layer 99 that covers the surface of the alloy 98.

Part of the cooling air Ac present on the radially outer side Dro of the vane 50 is supplied from inside the intermediate casing 14. Part of this cooling air Ac flows into the inner cavity 69 of the outer shroud 60o through the air holes 68 formed in the impingement plate 67 of the outer shroud 60o. In this process, the cooling air Ac impinges on the surface of a member forming the inner cavity 69 and impingement-cools this surface. As a result, the gas path surface 64 opposite from this surface is cooled with the cooling air Ac.

Part of the cooling air Ac having flowed into the inner cavity 69 of the outer shroud 60o flows into the vane air passages 71 opening at the bottom of the recess 66 of the outer shroud 60o. The cooling air Ac having flowed into the vane air passages 71 convectively cools the vane body 51 in the process of flowing through the vane air passages 71. As described above, the cooling air Ac having flowed into the vane air passages 71 flows out of the vane surface blowout passages 72 into the combustion gas flow passage 49. Thus, the leading edge 52 and the trailing edge 53 of the vane body 51 are cooled in the process of the cooling air Ac flowing out of the vane surface blowout passages 72. Moreover, part of the cooling air Ac having flowed out of the vane surface blowout passages 72 into the combustion gas flow passage 49 film-cools the vane body 51 by partially covering the surface of the vane body 51.

On the other hand, part of the cooling air Ac present on the radially inner side Dri of the vane 50 is supplied from inside the intermediate casing 14. Part of this cooling air Ac flows into the inner cavity 69 of the inner shroud 60i through the air holes 68 formed in the impingement plate 67 of the inner shroud 60i. In this process, the cooling air Ac impinges on the surface of a member forming the inner cavity 69 and impingement-cools this surface. As a result, the gas path surface 64 opposite from this surface is cooled with the cooling air Ac.

Part of the cooling air Ac having flowed into the inner cavity 69 of the inner shroud 60i flows into the vane air passages 71 opening at the bottom of the recess 66 of the inner shroud 60i. The cooling air Ac having flowed into the vane air passages 71 convectively cools the vane body 51 in the process of flowing through the vane air passages 71. The cooling air Ac having flowed into the vane air passages 71 flows out of the vane surface blowout passages 72 into the combustion gas flow passage 49. Thus, the leading edge 52 and the trailing edge 53 of the vane body 51 are cooled in the process of the cooling air Ac flowing out of the vane surface blowout passages 72. Moreover, part of the cooling air Ac having flowed out of the vane surface blowout passages 72 into the combustion gas flow passage 49 film-cools the vane body 51 by partially covering the surface of the vane body 51.

Part of the cooling air Ac having flowed into the inner cavity 69 of the outer shroud 60o flows into the pressure-side passage 73p and the suction-side passage 73n of the outer shroud 60o. Part of the cooling air Ac having flowed into the inner cavity 69 of the inner shroud 60i flows into the pressure-side passage 73p and the suction-side passage 73n of the inner shroud 60i. The cooling air Ac having flowed into the pressure-side passage 73p convectively cools a part of the outer shroud 60o or the inner shroud 60i closer to the pressure-side end surface 63p in the process of flowing through the pressure-side passage 73p. The cooling air Ac having flowed into the suction-side passage 73n convectively cools a part of the outer shroud 60o or the inner shroud 60i closer to the suction-side end surface 63n in the process of flowing through the suction-side passage 73n.

Part of the cooling air Ac having flowed into the pressure-side passage 73p and the suction-side passage 73n flows into the back header passage 74. The cooling air Ac having flowed into the back header passage 74 flows into the plurality of back passages 75. The cooling air Ac having flowed into the back passages 75 flows to the outside from the back end surface 62b of the outer shroud 60o or the inner shroud 60i. The cooling air Ac convectively cools a part of the outer shroud 60o closer to the back end surface 62b or a part of the inner shroud 60i closer to the back end surface 62b in the process of flowing through the back passages 75. The cooling air Ac having flowed to the outside from the back end surface 62b of the outer shroud 60o or the inner shroud 60i flows along the back end surface 62b and flows into the combustion gas flow passage 49.

As shown in FIG. 5, another part of the cooling air Ac having flowed into the inner cavity 69 of the outer shroud 60o flows through the plurality of circumferential blowout passages 95 of the outer shroud 60o, and flows to the outside from the openings in the pressure-side end surface 63p of the outer shroud 60o. This cooling air Ac flows into the combustion gas flow passage 49 by flowing toward the downstream side Dad as well as the radially inner side Dri, between the pressure-side end surface 63p of the outer shroud 60o of the vane 50 and the suction-side end surface 63n of the outer shroud 60o of another vane 50 that is on the circumferential pressure side Dcp of and adjacent to the vane 50. Thus, the combustion gas G can be kept from flowing from the combustion gas flow passage 49 into the gap between the pressure-side end surface 63p of the outer shroud 60o of the vane 50 and the suction-side end surface 63n of the outer shroud 60o of the other vane 50. Moreover, the pressure-side end surface 63p of the vane 50 and the suction-side end surface 63n of the other vane 50 are cooled with the cooling air Ac.

As shown in FIG. 6, another part of the cooling air Ac having flowed into the inner cavity 69 of the inner shroud 60i flows through the plurality of circumferential blowout passages 95 of the inner shroud 60i, and flows to the outside from the openings in the pressure-side end surface 63p of the inner shroud 60i. This cooling air Ac flows into the combustion gas flow passage 49 by flowing toward the downstream-side Dad as well as the radially outer side Dro, between the pressure-side end surface 63p of the inner shroud 60i of the vane 50 and the suction-side end surface 63n of the inner shroud 60i of another vane 50 that is on the circumferential pressure side Dcp of and adjacent to the vane 50. Thus, the combustion gas G can be kept from flowing from the combustion gas flow passage 49 into the gap between the pressure-side end surface 63p of the inner shroud 60i of the vane 50 and the suction-side end surface 63n of the inner shroud 60i of the other vane 50. Moreover, the pressure-side end surface 63p of the vane 50 and the suction-side end surface 63n of the other vane 50 are cooled with the cooling air Ac.

As shown in FIG. 3, the cooling air Ac having flowed out of the circumferential blowout passages 95 diffuses gradually as it approaches the gas path surface 64. In this embodiment, as described above, the openings of the circumferential blowout passages 95 are formed in the pressure-side end surface 63p of each shroud, on the side closer to the seal groove 77 than to the gas path surface 64 in the radial direction Dr. Accordingly, in this embodiment, the cooling air Ac has diffused more widely at the point when the cooling air Ac reaches the gas path surface 64 than if the openings of the circumferential blowout passages 95 are formed in the pressure-side end surface 63p of each shroud, on the side closer to the gas path surface 64 than to the seal groove 77 in the radial direction Dr. Moreover, in this embodiment, regions of diffusion of currents of the cooling air Ac flowing out of the plurality of circumferential blowout passages 95 overlap one another at the point when the cooling air Ac reaches the gas path surface 64.

Thus, according to this embodiment, wide areas of the pressure-side end surface 63p and the suction-side end surface 63n of each shroud can be cooled with the currents of the cooling air Ac flowing out of the plurality of circumferential blowout passages 95. Moreover, according to this embodiment, the regions of diffusion of the currents of the cooling air Ac flowing out of the plurality of circumferential blowout passages 95 overlap one another at the point when the cooling air Ac reaches the gas path surface 64, so that the combustion gas can be kept from flowing from the combustion gas flow passage 49 into the gap between the pressure-side end surface 63p of one vane 50 and the suction-side end surface 63n of another vane 50 adjacent to this one vane 50.

Tests etc. have confirmed that the central region 91 of the pressure-side end surface 63p of the outer shroud 60o reaches a higher temperature than the upstream-side region 92 and the downstream-side region 93 of the pressure-side end surface 63p. It has been also confirmed that the central region 91 of the suction-side end surface 63n of the outer shroud 60o reaches a higher temperature than the upstream-side region 92 and the downstream-side region 93 of the suction-side end surface 63n. Similarly, it has been confirmed that the central region 91 of the pressure-side end surface 63p of the inner shroud 60i reaches a higher temperature than the upstream-side region 92 and the downstream-side region 93 of the pressure-side end surface 63p, and that the central region 91 of the suction-side end surface 63n of the inner shroud 60i reaches a higher temperature than the upstream-side region 92 and the downstream-side region 93 of the suction-side end surface 63n.

At present, this phenomenon that the central region 91 reaches a higher temperature than the upstream-side region 92 and the downstream-side region 93 has not been clearly analyzed. However, the phenomenon that the central region 91 reaches a higher temperature than the upstream-side region 92 and the downstream-side region 93 seems to occur due to the following reasons.

As shown in FIG. 4, the combustion gas G inside the combustion gas flow passage 49 flows between the vane bodies 51 of the vanes 50 adjacent to each other in the circumferential direction Dc. Specifically, the combustion gas G flows between the pressure-side surface 55 of the vane body 51 of one vane 50 and the suction-side surface 54 of another vane body 51 adjacent to this one vane 50. The distance between the pressure-side surface 55 of the vane body 51 of the one vane 50 and the suction-side surface 54 of the other vane body 51 adjacent to this one vane 50 decreases gradually from the upstream side Dau, and becomes smallest at the throat position. In other words, the cross-sectional area of the combustion gas flow passage between the pressure-side surface 55 of the vane body 51 of one vane 50 and the suction-side surface 54 of another vane body 51 adjacent to this one vane 50 decreases gradually from the upstream side Dau of this combustion gas flow passage and becomes smallest at the throat position. Therefore, in a region including the throat position at which the combustion gas flow passage is narrow, the combustion gas G inside the combustion gas flow passage penetrates into the gap between the shrouds.

The entire surface of the vane body 51 and the entire gas path surface 64 of each shroud are formed by the TBC layer 99. On the other hand, regions closer to the gas path surface 64 of the suction-side end surface 63n and the pressure-side end surface 63p of each shroud are formed by the TBC layer 99, while the alloy 98 is exposed in regions of these end surfaces farther away from the gas path surface 64. Accordingly, in the central region 91 including the throat position of the suction-side end surface 63n and the pressure-side end surface 63p of each shroud, a region of the central region 91 in which the alloy 98 is exposed may be thermally damaged as a result of the combustion gas G inside the combustion gas flow passage penetrating into the gap between the shrouds as described above.

In this embodiment, therefore, the cooling air Ac is blown out from the central region 91 including the throat position of the suction-side end surface 63n and the pressure-side end surface 63p of each shroud to intensively cool the central region 91. Thus, thermal damage to the central region 91 can be reduced in this embodiment.

On the other hand, in the upstream-side region 92 and the downstream-side region 93, the combustion gas G inside the combustion gas flow passage is less likely to penetrate into the gap between the shrouds than in the central region 91. Accordingly, it is less likely that regions in which the alloy 98 is exposed inside the upstream-side region 92 and the downstream-side region 93 of the suction-side end surface 63n and the pressure-side end surface 63p of each shroud are thermally damaged. In this embodiment, therefore, the density of the openings of the circumferential blowout passages 95 in the upstream-side region 92 and the downstream-side region 93 is set to be lower than the density of the openings of the circumferential blowout passages 95 in the central region 91.

Thus, according to this embodiment, it is possible to efficiently use the cooling air Ac so as to improve the durability of the vane 50 and at the same time reduce the amount of cooling air Ac used.

First Modified Example

Figure 7:
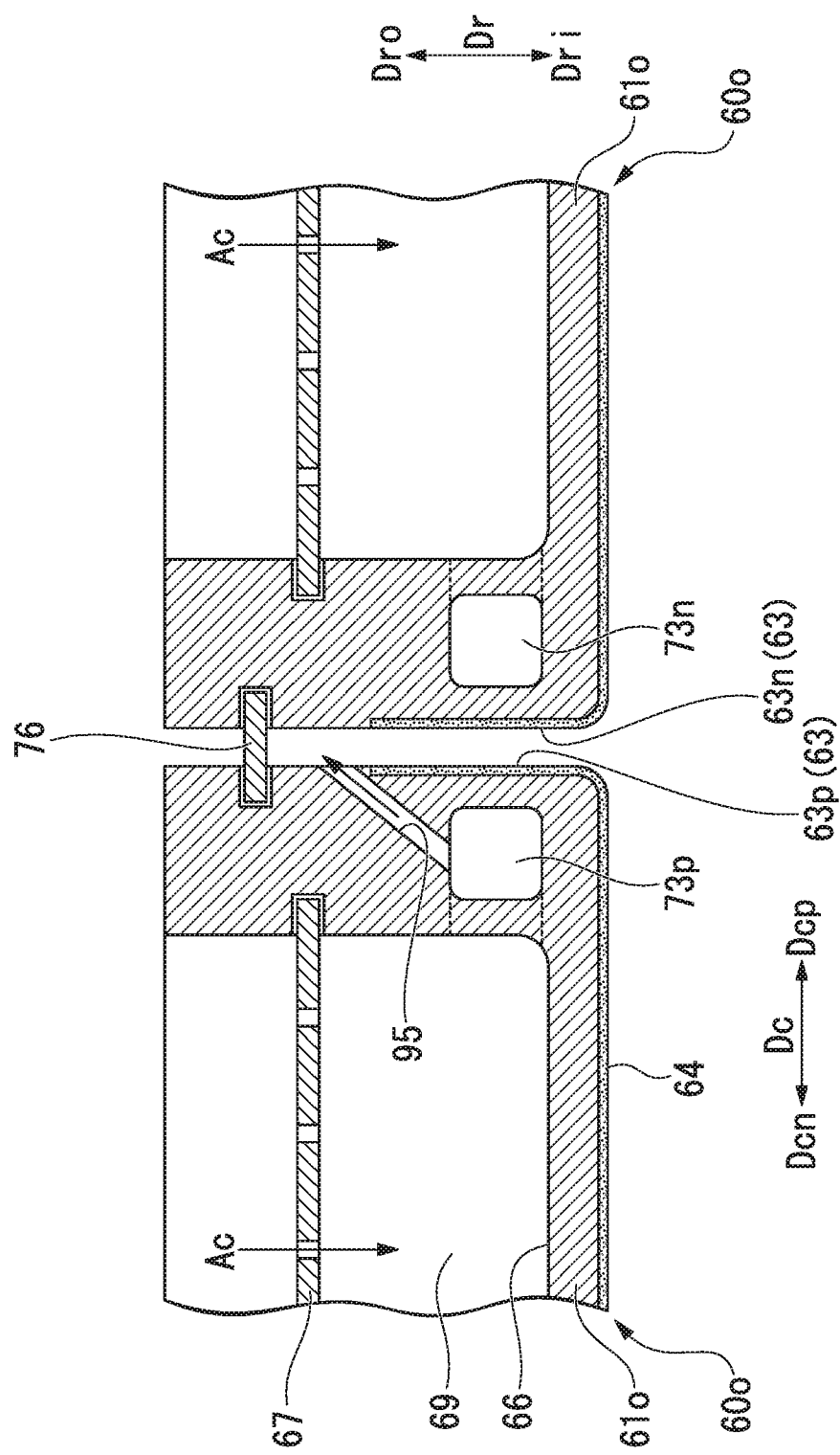
FIG. 7 is a sectional view of an outer shroud in a first modified example of the embodiment according to the present invention.

The circumferential blowout passages 95 of the above embodiment extend through the pressure-side peripheral wall 65p from the inner cavity 69 to the pressure-side end surface 63p. However, as long as the circumferential blowout passages 95 allow the cooling air Ac to blow from the pressure-side end surface 63p to the outside, for example, the circumferential blowout passages 95 may extend from the pressure-side passage 73p to the pressure-side end surface 63p as shown in FIG. 7. In this case, too, the circumferential blowout passages 95 communicate with the inner cavity 69 through the pressure-side passage 73p. In the case where the circumferential blowout passages 95 open in the suction-side end surface 63n, the circumferential blowout passages 95 may extend from the suction-side passage 73n to the suction-side end surface 63n.

Second Modified Example

Figure 8:
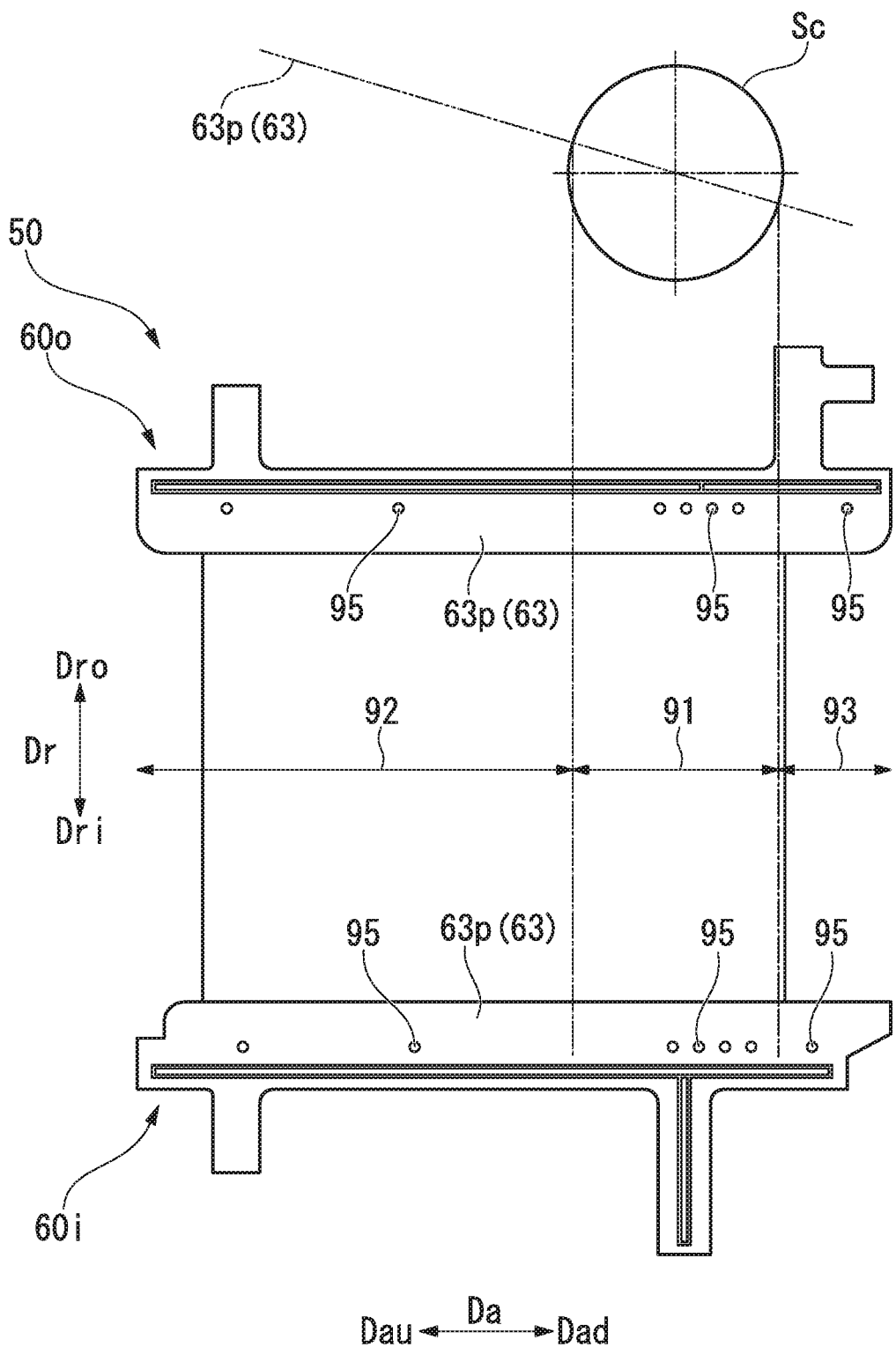
FIG. 8 is a side view of a vane in a second modified example of the embodiment according to the present invention.

In the above embodiment, the openings of the circumferential blowout passages 95 are formed only in the central region 91 of the circumferential end surface 63, and no openings are formed in the upstream-side region 92 and the downstream-side region 93. However, as shown in FIG. 8, the openings of the circumferential blowout passages 95 may be formed not only in the central region 91 but also in the upstream-side region 92 and the downstream-side region 93 of the circumferential end surface 63. In this case, too, from the viewpoint of reducing the amount of cooling air Ac used, the density of the openings of the circumferential blowout passages 95 is set to be lower in the upstream-side region 92 and the downstream-side region 93 than in the central region 91.

Other Modified Examples

In the above embodiment, the openings of the plurality of circumferential blowout passages 95 are formed only in the pressure-side end surface 63p. However, the openings of the plurality of circumferential blowout passages 95 may be formed only in the suction-side end surface 63n, or may be formed in both circumferential end surfaces 63 of the pressure-side end surface 63p and the suction-side end surface 63n. Tests etc. have confirmed that the vane 50 can be cooled most efficiently when the openings of the plurality of circumferential blowout passages 95 are formed only in the pressure-side end surface 63p as in the above embodiment. Here, cooling efficiently means cooling a predetermined region with the cooling air Ac at a low flow rate so that the temperature of this region does not exceed a predetermined temperature. Therefore, in the case where the openings of the plurality of circumferential blowout passages 95 are formed only in the pressure-side end surface 63p, compared with other cases, the pressure-side end 63p and the suction-side end surface 63n of another vane 50 facing this pressure-side end surface 63p can be cooled with the cooling air Ac at a low flow rate so that the temperatures of these end surfaces do not exceed a predetermined temperature.

In the above embodiment, the number of the openings of the circumferential blowout passages 95 formed in the central region 91 of the circumferential end surface 63 is four. However, this number may instead be three or smaller, or five or larger.

In the above embodiment, the space inside the recess 66 of the shroud is partitioned by the impingement plate 67 into two spaces, and the circumferential blowout passages 95 communicate with the inner cavity 69 that is one of these two spaces. However, the circumferential blowout passages 95 may instead communicate with the other of these two spaces.

In the above embodiment, the region of the circumferential end surface 63 located inside the throat circle Sc is defined as the central region 91, and the openings of the plurality of circumferential blowout passages 95 are formed in this region. However, in this embodiment, a region including a joint 76a between the two seal plates 76 fitted in the seal groove 77 of the outer shroud 60o overlaps the central region 91, and thus this region also reaches a high temperature. Moreover, in this embodiment, a region including a joint 76b between the seal plate 76 fitted in the seal groove 77 of the inner shroud 60i and the seal plate 76 fitted in the vertical seal groove 86 thereof overlaps the central region 91, and thus this region also reaches a high temperature. Therefore, regions that respectively include the joints 76a, 76b between the two seal plates 76 and that are each located inside a circle having the same radius as the throat circle Sc may be defined as central regions, and the openings of the plurality of circumferential blowout passages 95 may be formed in these regions. Furthermore, in this embodiment, a region of the inner shroud 60i in which the retainer 81 is provided overlaps the central region, and thus this region also reaches a high temperature. Therefore, a region of the inner shroud 60i that includes the region where the retainer 81 is provided and that is located inside a circle having the same radius as the throat circle Sc may be defined as a central region, and the openings of the plurality of circumferential blowout passages 95 may be formed in this region.

In the above embodiment, the back header passage 74 communicates with each of the pressure-side passage 73p and the suction-side passage 73n, and the plurality of back passages 75 communicate with the back header passage 74. However, it is not necessary to form the back header passage 74 and the plurality of back passages 75 inside the vane 50.

INDUSTRIAL APPLICABILITY

According to one aspect of the present invention, it is possible to effectively cool the vane so as to improve the durability thereof and at the same time reduce the amount of cooling air used.

REFERENCE SIGNS LIST

10 Gas turbine
11 Gas turbine rotor
15 Gas turbine casing
20 Compressor
21 Compressor rotor
25 Compressor casing
30 Combustor
40 Turbine 41 Turbine rotor
42 Rotor shaft
43 Blade row
43a Blade
45 Turbine casing
46 Vane row
49 Combustion gas flow passage
50 Vane
51 Vane body
52 Leading edge
53 Trailing edge
54 Suction-side surface
55 Pressure-side surface
60o Outer shroud
60i Inner shroud
61o Outer shroud main body
61i Inner shroud main body
62f Front end surface
62b Back end surface
63 Circumferential end surface
63p Pressure-side end surface
63n Suction-side end surface
64 Gas path surface
65o, 65i Peripheral wall
66 Recess
67 Impingement plate
69 Inner cavity (cavity)
71 Vane air passage
72 Vane surface blowout passage
73p Pressure-side passage (circumferential end passage)
73n Suction-side passage (circumferential end passage)
74 Back header passage
75 Back passage
76 Seal plate
76a, 76b Joint between seal plates
77 Seal groove
81 Retainer
86 Vertical seal groove
91 Central region
92 Upstream-side region
93 Downstream-side region
95 Circumferential blowout passage
98 Alloy
99 TBC layer
Da Axial direction
Dau Upstream side
Dad Downstream side
Dc Circumferential direction
Dcp Circumferential pressure side
Dcn Circumferential suction side
Dr Radial direction
Dri Radially inner side
Dro Radially outer side
Ac Cooling air
G Combustion gas

The invention claimed is:

1. A vane of a gas turbine in which a plurality of vanes are disposed in an array in a circumferential direction around a rotor shaft, the vane comprising:
   a vane body that is disposed inside a combustion gas flow passage through which combustion gas flows, and that extends in a radial direction of the rotor shaft; and
   a shroud that is formed at an end of the vane body in the radial direction and defines a part of the combustion gas flow passage, wherein
   the shroud has a gas path surface that faces the radial direction and comes in contact with the combustion gas, a pair of circumferential end surfaces that face opposite sides in the circumferential direction, a cavity into which cooling air flows, and a plurality of circumferential blowout passages that communicate with the cavity and open in at least one of the pair of circumferential end surfaces,
   each of the pair of circumferential end surfaces has a central region that is a region located inside a throat circle with a minimum radius while being in contact with both the vane body of the vane and a vane body of another vane adjacent to the vane in the circumferential direction, an upstream-side region that is located further on an upstream side of the combustion gas flow passage than the central region, and a downstream-side region that is located on an opposite side of the central region from the upstream side, and openings of the plurality of circumferential blowout passages are formed at least in the central region, and
   a density that is the number of the openings of the circumferential blowout passages per unit length in an axial direction in which the rotor shaft extends is higher in the central region Than in the upstream-side region and the downstream-side region.

2. The vane of a gas turbine according to claim 1, wherein the density of the openings of the circumferential blowout passages in the upstream-side region and the downstream-side region is zero.

3. The vane of a gas turbine according to claim 1, wherein of the pair of circumferential end surfaces, one circumferential end surface forms a pressure-side end surface that is on a pressure side of the vane body in the circumferential direction, and the other circumferential end surface forms a suction-side end surface that is on a suction side of the vane body in the circumferential direction, and
   the density of the openings of the plurality of circumferential blowout passages is higher in the pressure-side end surface than in the suction-side end surface.

4. The vane of a gas turbine according to claim 3, wherein the density of the openings of the circumferential blowout passages in the suction-side end surface is zero.

5. The vane of a gas turbine according to claim 1, wherein each of the pair of circumferential end surfaces has a seal groove formed therein in which a seal plate that seals a gap between the shroud of the vane and the shroud of another vane adjacent to the vane in the circumferential direction is mounted, and
   the openings of the plurality of circumferential blowout passages are formed on a side closer to the seal groove than to the gas path surface in the radial direction.

6. The vane of a gas turbine according to claim 1, wherein a circumferential end passage that communicates with the cavity and extends along each of the pair of circumferential end surfaces in a direction having a component of the axial direction is formed inside the shroud, and
   relative to the circumferential end passage, the openings of the plurality of circumferential blowout passages are formed on an opposite side from the gas path surface in the radial direction.

7. The vane of a gas turbine according to claim 6, wherein the plurality of circumferential blowout passages communicate with the circumferential end passage.

8. A gas turbine comprising:
   the plurality of vanes according to claim 1;
   the rotor shaft;
   a plurality of blades mounted on the rotor shaft; and a casing on an inner circumferential side of which the plurality of vanes are mounted and which covers the rotor shaft and the plurality of blades.

* * * * *